United States Patent

[11] 3,591,727

[72] Inventor Walter H. Shaw
600 N.W. 196th St., Miami, Fla. 33169

[21] Appl. No. 782,636
[22] Filed Dec. 10, 1968
[45] Patented July 6, 1971

[54] AUTOMATIC REROUTING SYSTEM FOR TELEPHONE SUBSCRIBER STATION
4 Claims, 7 Drawing Figs.

[52] U.S. Cl. ............ 179/18
[51] Int. Cl. ............ H04m 3/54
[50] Field of Search ............ 179/18.03, 5 P

[56] References Cited

OTHER REFERENCES

ENCYCLOPEDIA DICTIONARY OF ELECTRONICS AND NUCLEAR ENGINEERING Robert I. Sarbacher, Prentice Hall, 1959 pp. 313, 314, 315 copy available in art unit 232.

*Primary Examiner*—Kathleen H. Claffy
*Assistant Examiner*—David L. Stewart
*Attorney*—Whittemore, Hulbert and Belknap

ABSTRACT: A subscriber station is provided with equipment which, in response to an incoming call on one of plural remote lines to that station, holds that line, transmits over another line to that station the dialing code of a preselected remote station, using a known type of automatic dialing unit connected to the circuitry of the subscriber station, and completes at the subscriber station a coupling link between said remote lines for communication between and the remote station of origin of the call and the preselected remote station. The subscriber has complete control in rerouting of calls directed to his station and may change the rerouting destination to suit his needs.

INVENTOR.
WALTER H. SHAW
BY
Whittemore, Hulbert & Belknap
ATTORNEYS

*INVENTOR.*
WALTER H. SHAW
*BY*
ATTORNEYS

INVENTOR.
WALTER H. SHAW
BY W. Hillemore, Hulbert & Belknap
ATTORNEYS

INVENTOR
WALTER H. SHAW

BY Whittemore, Hulbert & Belknap
ATTORNEYS

AUTOMATIC REROUTING SYSTEM FOR TELEPHONE SUBSCRIBER STATION

CROSS REFERENCE TO RELATED APPLICATION

The improved system is generally similar in function to that illustrated and described in a copending application of the present applicant, Ser. No. 605,737, filed Dec. 29, 1966, save for the fact that the system of said application is a manually operated one, whereas the rerouting system of the subject application is automatic in its operation, following the performance of simple initial switch closing and manual dialing steps.

BACKGROUND OF THE INVENTION

1. Field of the Invention

The present invention relates to systems for rerouting telephone calls, and particularly relates to equipment used at a subscriber station and there preset automatically to transfer incoming calls for that station to any other preselected station served by the telephone system, without dependence upon or recourse to the personnel or equipment of a telephone exchange or of an answering service.

2. Description of the Prior Art

The following patents represent the most pertinent prior art known to the applicant:

| Patentee | Patent No. | Date | Class |
|---|---|---|---|
| Engel | 2,124,913 | July 26, 1938 | 179-18 |
| Lomax | 2,274,715 | Mar. 3, 1942 | 179-18 |
| Wicks | 2,274,760 | Mar. 3, 1942 | 179-18 |
| Gutierrez | 2,806,902 | Sept. 17, 1957 | 179-5 |

The telephone systems disclosed in the above citations are of considerable complexity in respect to the circuitry thereof, making it impractical to present an analysis thereof in even general detail. Summarizing briefly, Engel provides a device used as an accessory part of a subscriber station, with impulse actuated line connecting means, an impulse sending device in the line of the called subscriber and motor actuated switch means determining the sending of impulses corresponding to the number of a third subscriber.

Lomax deals with an automatic telephone system in which operation of an impulse sender is in response to a call routed to a substation to transmit switch control impulses over either of a pair of lines to the substation. The Wicks patent relates primarily to automatic switching apparatus at a telephone exchange of a system. Gutierrez covers provisions in an automatic dialing device including timing means to connect a call delivering means to a call transmitting means after an interval in which automatic dialing means operates.

SUMMARY OF THE INVENTION

The rerouting equipment at the subscriber station includes an automatic dialing unit associated with one of the subscriber lines and a ringing relay, or equipment responsive to calling pulses on another of the subscriber station lines. When energized by an incoming call, the ringing relay initiates a sequence of operations involving timing circuits and line-hold relay means by which the dialing unit is actuated to dial the preselected remote station for automatic transfer of the call thereto. In one of the embodiments of the equipment the network at the subscriber station incorporates equal impedance transformer coupling windings to afford uniformity of transmission of audible signals in the voice frequency range to connected remote lines.

The subscriber station may be additionally equipped to change the setting of the automatic dialing unit without need for the subscriber to return to his home station. Such automatic resetting of the dialing unit may be effected on basis of a prescheduled time program for dialing of different remote stations in predetermined sequence, or may be effected at any time in response to resetting signals sent to the subscriber station from another station.

DESCRIPTION OF PREFERRED EMBODIMENTS

Figure 1:
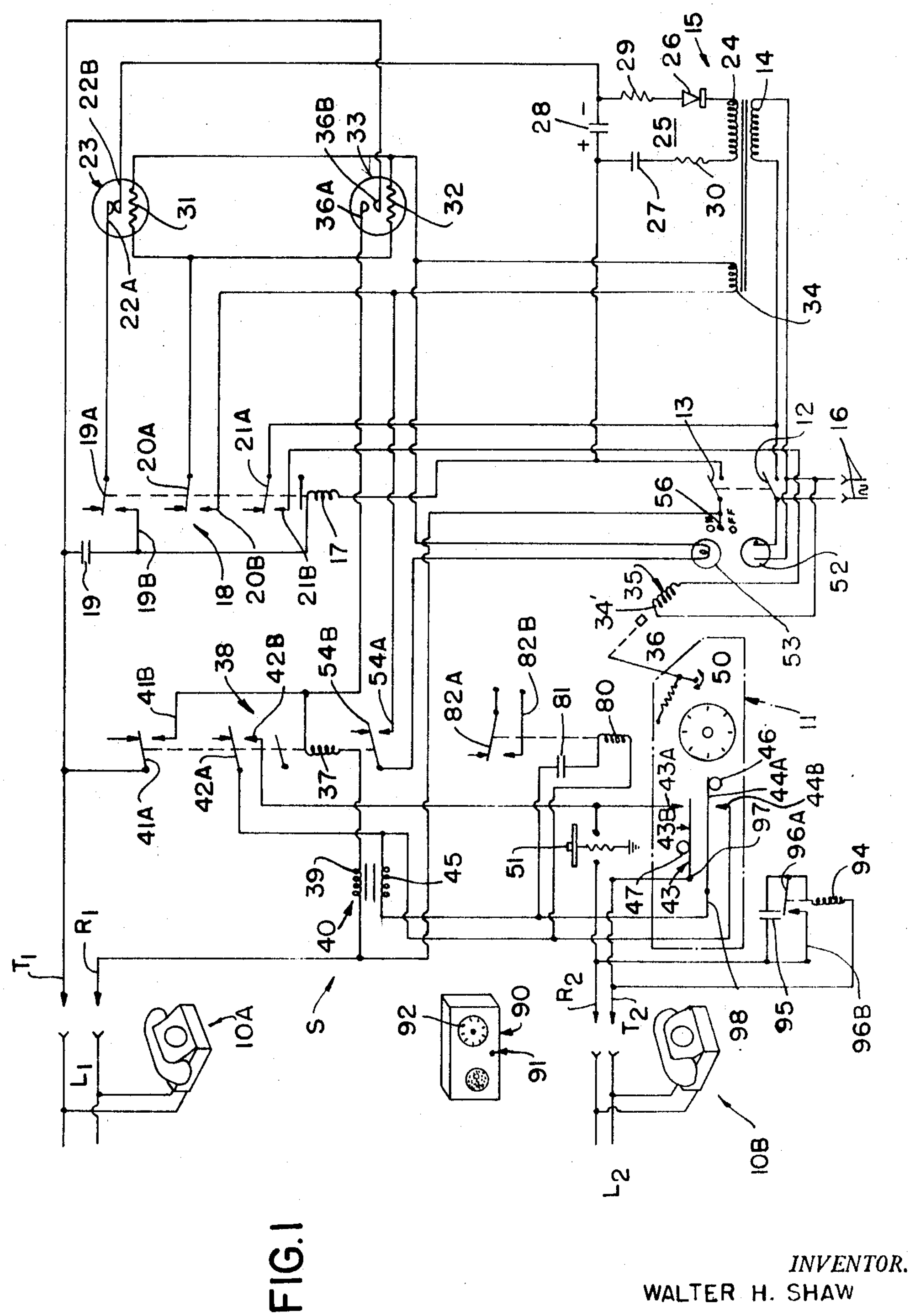
FIG 1 schematically shows the components and circuitry of a subscriber station with automatic call-rerouting equipment in accordance with one embodiment of the invention.
Figure 2:
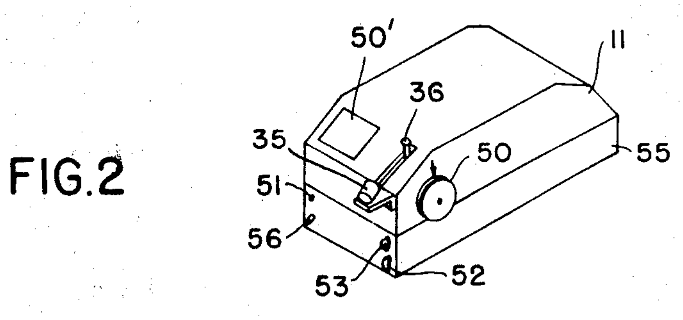
FIG. 2 is a perspective view of the rerouting system of FIG. 1 as housed to form a compact physical unit.

Referring to FIGS. 1 and 2, the lines L1, L2 are two telephone lines to a subscriber station S and there may be respectively connected in the usual manner to telephone sets 10A, 10B for use of both lines in customary manner to receive incoming calls or to make outgoing calls. Additionally to provide for automatic rerouting of incoming calls, as when the subscriber is to be at another station, the subscriber station S is equipped, in accordance with the invention, with auxiliary apparatus now described. Before leaving the home station S, reference being had to FIG. 2, the subscriber presets an automatic dialing unit 11, which may be one of several known to the art, to call a particular remote station and closes ganged switches 12, 13 in the circuitry of the improved system to put the rerouting equipment on standby. The closure of switch 12 connects the primary winding 14 of a power transformer 15 to a power input line 16, such as the usually available 110-volt, 60-cycle line. The closure of switch 13 connects the winding 17 of a high-impedance ringing relay 18 across the tip and ring conductors T1, R1 of line L1, in a path including the series-capacitor 19.

When the subscriber station receives the ringing pulses of an incoming call over line L1, the relay 18 responds to effect closure of three pairs of normally open contacts thereof. Closure of its contacts 19A, 19B completes a temporary hold-in circuit for the ringing relay 18. This hold-in circuit includes normally closed contacts 22A, 22B of a second time-delay relay 23. The hold-in current for winding 17 of relay 18 is provided by the high-voltage secondary winding 24 of transformer 15 through a network 25 which includes a rectifier 26, capacitors 27, 28 and resistors 29, 30. The capacitors may have a capacitance of the order of 10 microfarads and the resistors 29, 30 may have a resistance of the order of 500 ohms.

Figure 5:
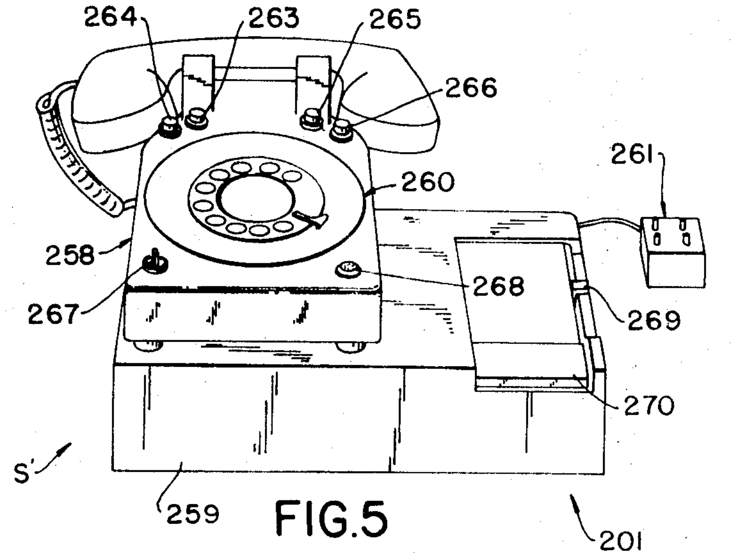
FIG. 5 is a perspective view showing an installation of the system of the invention in another embodiment, in combination with a different type of automatic dialing unit than that employed in the embodiment of FIGS. 1—4.
Figure 6:
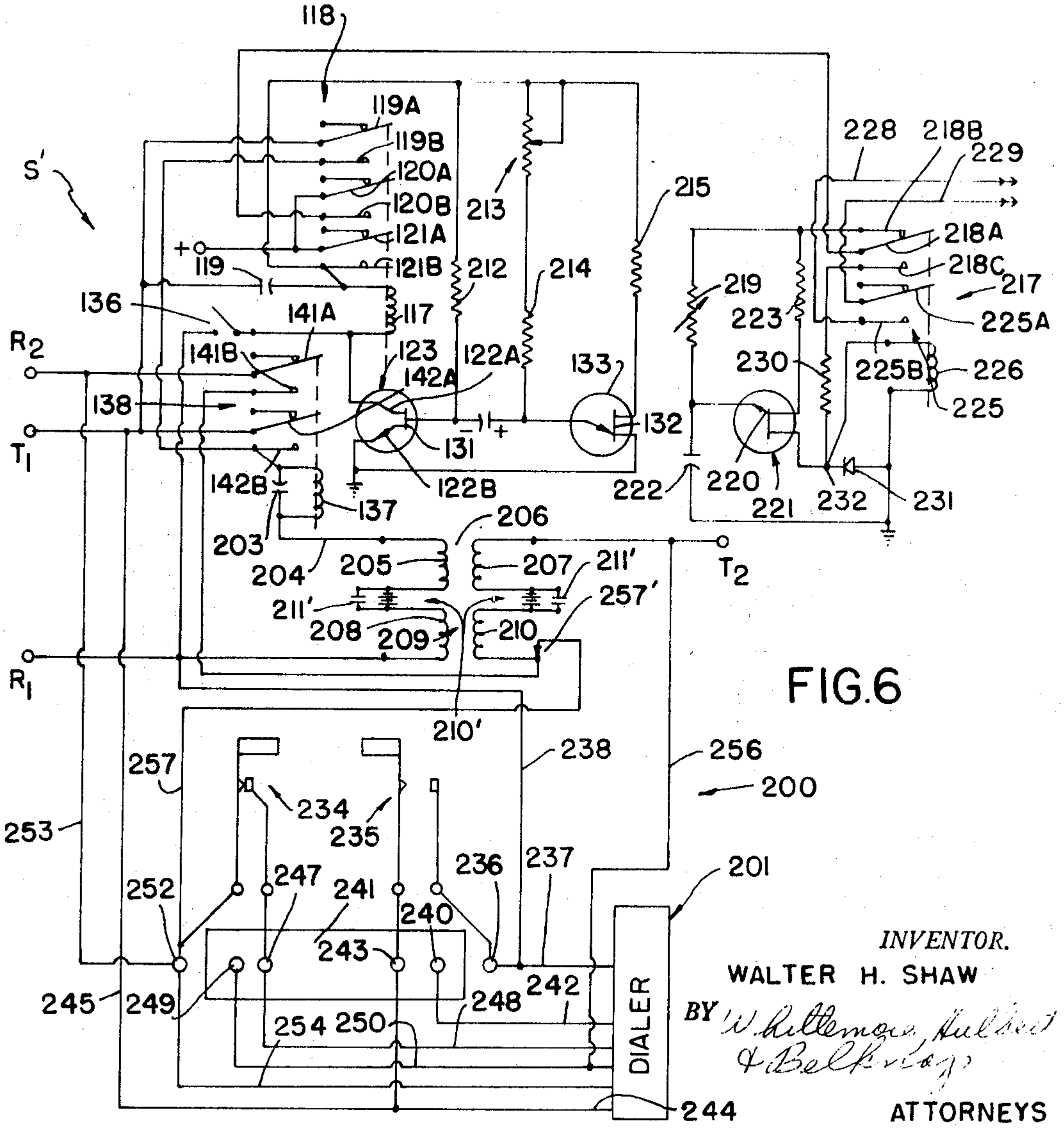
FIG. 6 is a wiring diagrammatic of the last named embodiment, the dialing unit being schematically shown; and, FIG. 7 is a schematic diagram of the circuitry of the dialing unit shown simply in box form in FIG. 6.
Figure 7:
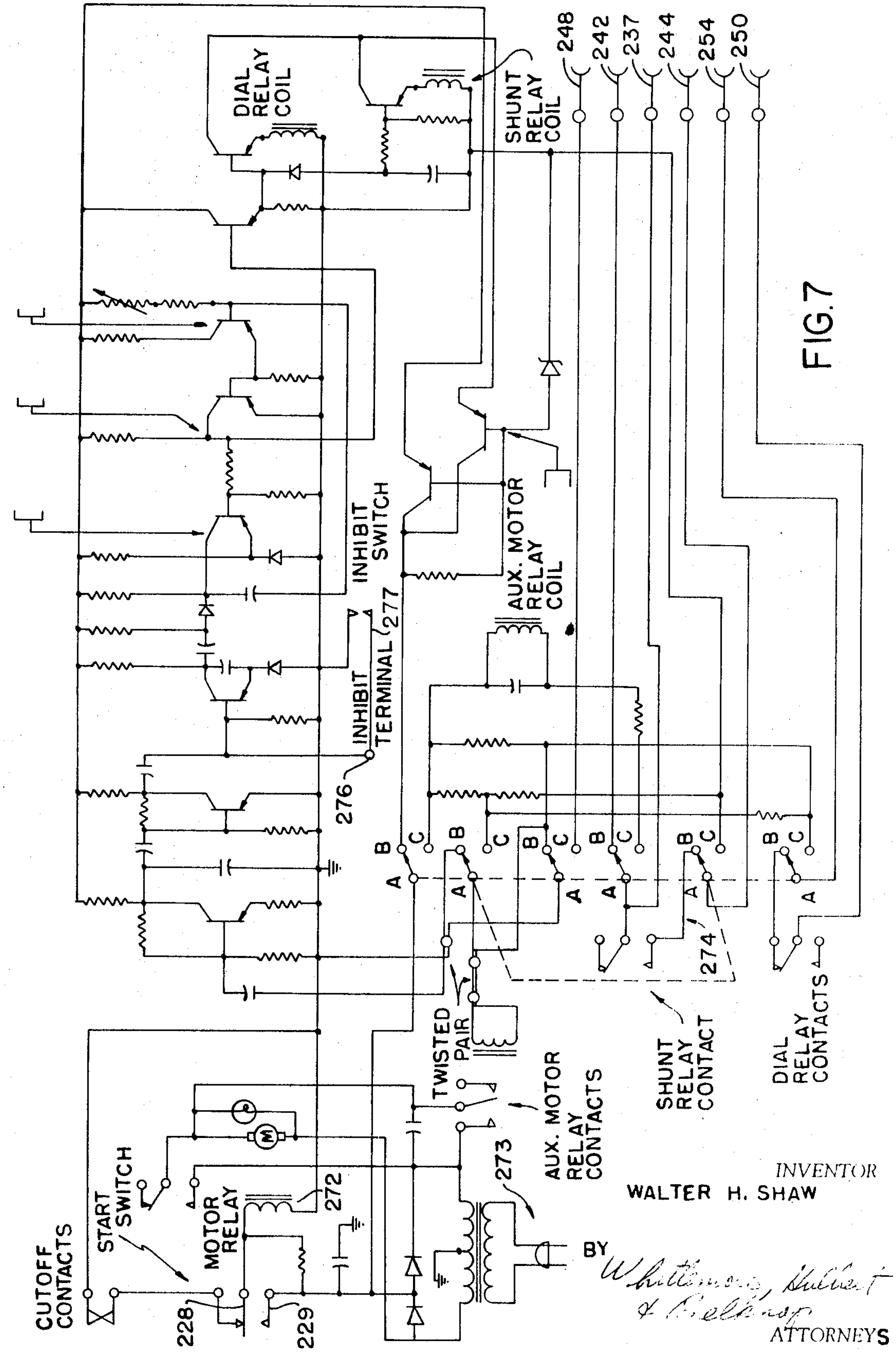

The closure of a second pair of contacts 20A, 20B of the ringing relay 18 connects the respective heater coils 31, 32 of time-delay relays 23, 33 to a low voltage secondary winding 34 of power transformer 15. The closure of the third pair of contacts 21A, 21B of ringing relay 18 connects the coil 34' of a solenoid motor 35 across the power line conductors beyond the switch 12. The movable core or armature of motor 35 is mechanically coupled to the "Start"-lever 36 of the automatic dialing unit 11. This may be of any suitable type, such as is shown in FIGS. 1—4 and sold under the trade name "Dialaphone" by the Dialaphone Company of California, or in the alternative, and preferably, as shown in FIGS. 5, 6 and 7, it may be a unit marketed by Rouge Electronics Company of Oklahoma City, Oklahoma under the designation Model 4000 and trademark "E—Z Dial." Circuitry of this unit is hereinafter generally described. It is also detailed in a Service Manual of that company copyrighted in 1964.

After a short interval, of say two seconds, following energization of ringing relay 18, the normally open contacts 36A, 36B of the first time-delay relay 33 close to connect a low-impedance winding 37 of a line-hold relay 38 across the telephone line L1 and in series with the primary winding 39 of the speechltransformer 40. The winding 37 of relay 38 is thus energized by direct current of the active line L1 to effect closure of its three pairs of normally open contacts including contacts 41A, 41B; 42A, 42B; and 54A, 54B. The closure of the first pair 41A, 41B completes a hold-in circuit to maintain connection of relay coil 37 and transformer coil 39 to line L1 after the time-delay relay 33 is deenergized, as later explained. The second pair of contacts 42A, 42B of relay 38 is connected to the tip and ring conductors T2, R2 of line L2 through the contacts 43A, 43B (when closed) of a dialing switch 43 of the automatic dialing unit 11. The closure of contacts 42A, 42B and the closure of contacts 43A, 43B, which are under the control of cam 47 to be subsequently described, complete the circuit to conductors T2, R2.

After a somewhat longer interval, of say 3 seconds, following energization of relay 18, the normally closed contacts 22A, 22B of time-delay relay 23 open to disconnect winding 17 of relay 18 from its hold-in circuit including the auxiliary supply network 25. The resultant opening of contacts 20A, 20B of relay 18 disconnects the heater coils of the time-delay relays 23, 33 from the secondary winding 34 carrying the heating current. The deenergization of relay 18 also results in return of its contacts 21A, 21B to normally open position to deenergize the solenoid motor 35 for the spring return of lever 36 of the automatic dialing unit 11 to its original position.

There is thus initiated a cycle of operation of the unit 11 during which, in manner per se known, the normally open contacts 43A, 43B of the dialing switch 43 are repeatedly opened and closed, as by a cam 47, in accordance with the dialing code of a remote station, which code is preset in unit 11. The dialing pulses as appearing on line L2 are effective to call the remote station so that the person making the call from a first remote station to the subscriber station is put in communication with a second remote station over the link afforded by transformer 40 which couples the lines L1, L2 of the subscriber station.

To preclude these dialing pulses from also appearing on Line L1 to the possible annoyance or confusion of the one making the call to the subscriber station, the dialing unit 11 may be provided with a muting switch 44 in shunt to the secondary winding 45 of transformer 40. The contacts 44A, 44B of the muting switch 44 are normally open but during the dialing cycle of unit 11 are maintained in closed circuit position, as by cam 46.

The rerouting system at the subscriber station S is wholly restored to standby condition upon deenergization of the hold-line relay 38 which occurs when the party who called the subscriber station terminates his call in the usual manner as by hanging up the telephone receiver.

Dialing units available for incorporation in the rerouting system are capable of storing, on punched tape, punched cards or magnetic tape, a large number of dialing codes, any of which may be preselected for dialing of a particular remote station. In the particular unit shown in FIG. 2, such selection is effected by turning a knob 50 of dialing unit 11 until the name of the desired person or company is visible in a window 50' of the unit and for which the position of the knob the corresponding dial code, as previously recorded on a card or tape, is in proper position to reproduce that code as dialing pulses by the make-and-break actuation of contacts 43A, 43B when the lever 36 is depressed and then released. Thus, a subscriber equipping his home or office with the auxiliary apparatus described may himself predetermine, in accordance with his work schedule, to what remote station will be rerouted the calls directed, during his absence, to his home station or office.

As previously noted, the connection of such call-rerouting system to the lines L1, L2 in no way interferes with normal use of the telephones 10A, 10B at the subscriber station; moreover, the automatic dialing unit 11 may also be used for its originally intended purpose by providing a switch or push button 51 in shunt to the normally open contacts of the hold relay 38. Thus, with the receiver of telephone unit 10B off its cradle or hook and with switch 51 closed, the lever 36 of the dialing unit 11 may be manually depressed and released automatically to dial any remote station for which the knob 50 is set.

Moreover, with the station equipped with the call-rerouting system described, the subscriber may prearrange a conference call between a party who is to call him at his station via line L1 at a scheduled time and a third party at another remote station. Before conference time, the subscriber sets the unit 11 for dialing of the remote station over line L2 and puts the rerouting system on standby by closing the switches 12, 13. An indicator 52, such as a neon bulb connected as shown, may be used to serve as a reminder that the rerouting system is on standby. At conference time, the subscriber may join the communication link established through his station simply by lifting off the receiver of either of the telephone units 10A, 10B.

To show that such communication link has been knob for conference purposes or otherwise, the automatic rerouting system may be provided with an indicator 53, such as a small incandescent bulb. This indicator may be in circuit with the secondary winding 34 of transformer 15 and the normally open contacts 54A, 54B of the line-hold relay 38. Thus, when the hold relay 38 is operated as above described to seize the line L1 in response to an incoming call, its contacts 54A, 54B close to light the indicator 53 so to show that the subscriber station is in a communication link between the remote station, identified by the knob setting of the dialing unit 11, and another remote station which has called the subscriber station on line L1.

To insure that the subscriber's line L2 may be free for rerouting of incoming calls to the subscriber station, the telephone line L2 may have an unlisted number. This, of course, does not preclude the subscriber when at his home station from making outgoing calls on either line and from receiving incoming calls on line L1 which has a listed telephone number.

The relays 18, 23, 33 and 38, the coupling transformer 40, and all components of the power supply, including transformer 15, may be disposed within a housing 55 (FIG. 2) having an external finger piece 36 operatively connected to the ganged switches 12 and 13, as well as the push button switch 51. These are conveniently operable and indicators 52, 53 are clearly visible. The housing 55, as shown in FIG. 2, may be attached to the automatic dialing unit 11 to form a complete, compact rerouting unit for the subscriber station. In this connection, it will be pointed out that the "Dialaphone" unit is only slightly larger than an ordinary telephone desk set and that the housing 55 is only about 2 inches deep.

With the arrangement described, the subscriber when at any remote station served by the telephone system and corresponding with the presetting of the automatic dialing unit 11 at his home station may receive all calls directed to his home station and there automatically rerouted to him. For changing the setting of the automatic dialing unit 11, the subscriber may return to the home station, or the dialing unit may be equipped with a control for shifting knob 50 of its equivalent to different preselected dialing settings at prescribed times in accordance with his scheduled visits to various remote stations, or the dialing unit 11 may be equipped with a shift or rewrite control responsive to resetting signals sent by the subscriber from any remote station to his home station.

Figure 3:
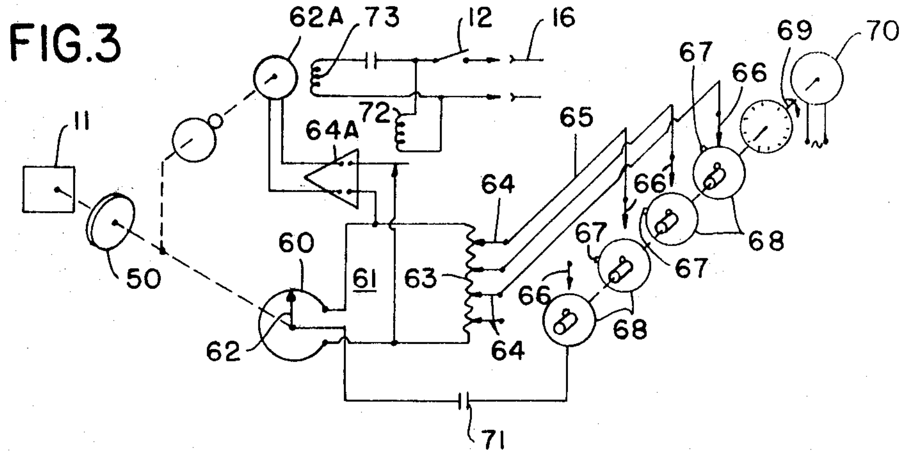
FIGS. 3 and 4 schematically show the components and circuitry of alternative arrangements for automatically shifting the setting of the dialing unit of FIGS. 1 and 2.

In FIG. 3 there is schematically shown a suitable time control for prescheduling the changes in setting of the automatic dialing unit 11. The knob 50, or equivalent, of the unit 11 is mechanically coupled to the adjustable element of the rebalancing slidewire 60 of a Wheatstone bridge network 61 and to the rebalancing motor 62A. At balance of network 61, the angular position of the slidewire 60 relative to its contact 62 corresponds with the angular position of knob 50 which, as previously pointed out, corresponds with the code dialing of a particular remote station. The resistor 63 of the bridge network has a plurality of contacts 64 individually adjustable to a setting determinative of the corresponding position of slidewire 60 for which the network is in balance, i.e., the setting of each contact 64 corresponds with one of the remote stations to be visited. Unbalance of the network 61 is detected by amplifier 64A and the amplified unbalance, whose phase corresponds with the sense of the unbalance, is applied to one winding of motor 62A. The other winding 73 of motor 62A has a fixed or reference phase excitation such as afforded from power line 16. The synchronous chopper 72, or equivalent, converts the DC unbalance of bridge 61 into an AC signal whose phase corresponds with the sense of the unbalance. Thus, the operation of motor 62A in response to an unbalance signal is in proper direction to restore balance by adjustment of slidewire 60 relative to its contact.

Each of the station-selector contacts 64 to be used for a particular visiting schedule of the subscriber to various remote stations is connected, as by a plug-in conductor 65, to one of the contacts 66 of a timer. Each of the contacts 66 is in the path of a contact 67 on a disc, or equivalent, adjustably attached to the shaft 69 of a clock motor 70. All the contacts 67 are connected to one terminal of a suitable bridge-current source, exemplified by battery 71. Slidewire contact 62 is connected to the other terminal of battery 71.

Thus, at times predetermined by the angular settings of contacts 67 with respect to timer-shaft 69, the bridge 61 will be energized for a brief interval—sufficient, however, to permit motor 62A to operate and rebalance the bridge 61. Therefore, at the successive times preset by the subscriber, the selector knob 50 of the automatic dialing unit 11 will be reset for dialing the code of the next remote station on the visiting schedule.

Figure 4:
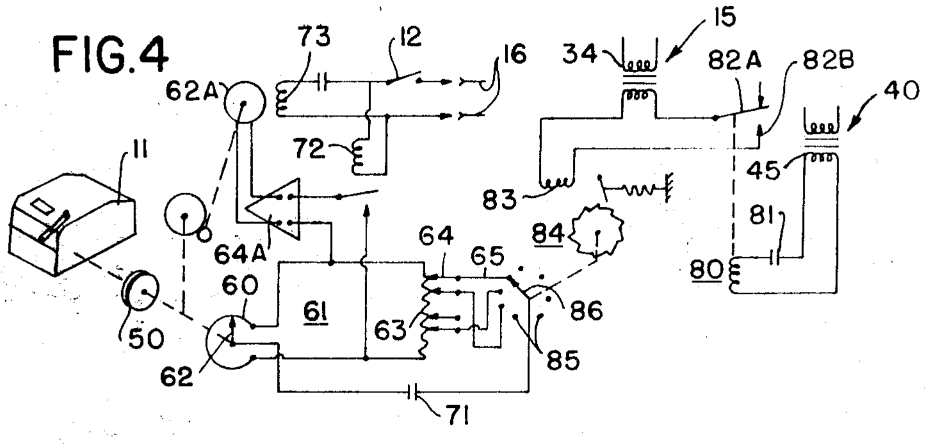

With the arrangement shown in FIG. 4, the subscriber may signal his home station from any station on the telephone system automatically to reset the dialing unit 11 at his home station for automatic rerouting of calls to the next remote station on his schedule. For such purpose, as shown in FIGS. 1 and 3, the subscriber station equipment additionally includes a signal relay 80 connected across the secondary 45 of the speech transformer 40 and in series with capacitor 81 for selective response to a signaling frequency of say 400 cycles. The response of this relay may be used in any suitable manner to reset the dial selector 50 of the automatic dialing unit 11.

In the particular arrangement shown in FIG. 4, the normally open contacts 82A, 82B of signal relay 80 are used to control the excitation of the motor 83 of a stepping switch 84. The fixed contacts 85 of the stepping switch are respectively connected, as by the plug-in conductor 65, to the various station-selector contacts 64 of resistor 63. As in the arrangement of FIG. 3, the contacts 64 are each preset in accordance with one of the remote stations to which calls are to be rerouted and are connected to the fixed contacts 85 of the stepping switch in the sequence of the particular schedule to be followed.

Thus, for example, when the subscriber has completed his business with the (FIG. 1) remote station on his schedule, he may call his home station, station S and give the signal to which relay 80 responds so to step the movable contact 86 of switch 84 to its next position. With the network now unbalanced by the selection of a contact 64 corresponding with the second or next remote station, the motor 62A responds to effect a rebalancing adjustment of slidewire contact 62 and concurrently repositions the dial selector knob 50 to the dialing setting for that next remote station. Hence, until the subscriber again signals his home station, the incoming calls directed thereto will be automatically transferred, as explained in the discussion of FIG. 1, to the next remote station on his schedule.

The source of signaling frequency may be a small or pocket-size unit 90 (FIG. 1 including for example a transistor audio-oscillator, and a small loudspeaker. For use with the system of FIG. 4, the subscriber calls his home station over line L1, holds the unit 90 near the telephone transmitter and presses the pushbutton or switch 91 which controls the oscillator to produce a frequency to which relay 80 at the home station responds.

Another method of remotely resetting the automatic dialing unit 11 when that unit is of the Dialaphone or equivalent type using magnetic tape, such as the "E—Z Dial" unit, is now described. In this case, the portable signaling unit 90 includes a dialing switch 92 such as used in conventional dial telephones and the home station equipment additionally includes a high-impedance, line-hold relay 94 for line L2. When the subscriber calls his home station over line L2, the dialing pulses, as transmitted through capacitor 95 to the relay coil, effect closure of contacts 96A, 96B to complete a hold-in circuit for continued energization of the coil by direct current then existing on line L2. While thereafter holding unit 90 near the telephone transmitter at the remote station, the subscriber actuates the dial 92 of unit 90 in accordance with the dialing code of the next remote station to which are to be rerouted any subsequent calls on line L1 of the subscriber's home station. These dialing pulses as superimposed on line L2 for application to terminals 97, 98 of the dialing unit 11 are therein utilized, in manner per se known, to write the dialing code of the next remote station on the magnetic tape and concurrently to erase the previous one. When the subscriber hangs up the telephone to terminate his resetting call, the line-hold relay 94 is deenergized. The home station equipment is now in readiness to transfer any subsequent incoming call on line L1 to the remote station whose dialing code is now stored on the tape of the unit 11.

FIGS. 5 and 6 illustrate an alternative combination of the basic circuitry of FIG. 1, as further modified to incorporate a balanced impedance coupling circuit (pursuant to my above-identified copending application), with a different type of automatic dialing unit or system. This is one of the "E—Z Dial" type units depicted in the Model 4000 Service Manual referred to above. To the considerable extent that components and wiring connections appearing in the schematic wiring diagram of FIG. 6 correspond to components and connections shown in the diagram of FIG. 1, they are designated by the reference numerals used in FIG. 1, but increased by 100, and further detailed description thereof is dispensed with. For example, the relay 18 of FIG. 1 appears as relay 118 in FIG. 6, and so on. Likewise, in the interest of clarity and simplicity, inasmuch as the equipment at the subscriber station, designated S′ in FIG. 6, involves a network 200 as a part of the automatic dialing unit 201 connecting the basic circuitry of the invention to that unit, the practice is later on adopted of specifically designating certain wiring leads and terminals by individual reference numerals. This will assist in coordinating the circuitry of FIG. 6 with that of FIG. 7, a detailed wiring diagram of the Model 4000 unit of Rouge Electronics Company.

Certain specific componential changes, wiring changes and additions have been incorporated in the improved circuit of FIG. 6, as compared with that of FIG. 1. For example, a capacitor 203 has been connected in parallel with the winding 137 of relay 138; and a lead 204 connects this coil with a winding 205 of a first balanced coupling transformer 206, whose other winding 207 connects to the tip conductor T2 of line L2. The opposite end of transformer winding 205 is coterminal with a winding 208 of a second balanced coupling transformer 209, whose opposite terminal is connected to the ring conductor R1 of line L1. The other winding 210 of transformer 209 has one terminal in common with the winding 207 of the transformer 206, and the opposite terminal of winding 210 connects to the contact 141B of relay 138, as well as to the "E—Z Dial" network 200, in a manner to be described.

The balanced transformer coupling afforded by windings 205, 207, 208 and 210, which are of equal impedance, has the effect, as described in my application, Ser. No. 605,737 mentioned above, of isolating the incoming and outgoing circuits electrically from one another at the subscriber station S′; and of insuring uniform transmission of signals in the voice frequency range to the remote station. In series with each of the coil windings 205, 208, 207, 210 of the balancing transformers 206,209 are "C" Cells 210′ of 1.5 volts each for the purpose of maintaining at all times the desired current level for normal telephone use. Across each "C" Cell 210′ is a 1 M.F.D. capacitor 211′ for accepting the voice currents.

Ring conductor R2 of the line L2 is shown as being connected to the contact 141A of relay 138, as well as to the network 200 in a manner to be described. Similarly, tip conductor T1 connects to contact 142A of that relay 138 and to network 200.

Ring conductor R1 of active line L1 is connected to switch 136 (which operates switch components, not shown, corresponding to the components 12 and 13 of FIG. 1), to the winding 208 of transformer unit 209, and is also connected in common with switch 136 to the automatic dialing connector network 200 by lead means to be described. The same is true of the tip conductor T2 of line L2.

The basic circuitry depicted in FIG. 6 has a resistor 212 between the contact 121B of relay 118 and timing relay 123; a potentiometer 213 and fixed resistor 214 between contact 121B and the other time-delay relay 133; plus a further resistor 215 between contact 121B and the coil 132 of relay 133. A capacitor 216 is included in the connection between timing relays 123 and 133; and the contact 122B of relay 123 and coil 132 of relay 133 are grounded.

FIG. 6 additionally shows the basic transformer coupled circuit system as including a subcircuit, generally designated 217, involving mute and pulse contactors of the "E—Z Dial" unit or system 201. This is a grounded circuit supplied with current from the contact 120B of relay 118, including a dial pulse contact 218A connected to contact 120B and alternately engageable with fixed contacts 218B and 218C. Contact 218B is connected through a variable resistor 219 with a contact 220 of a time-delay relay 221, with a capacitor 222 between that contact and ground. Contact 218B also connects through a resistor 223 with the heater coil of relay 221.

The contact 218C is ganged with a second movable contact 225A of a relay 225 of the subcircuit 217, the relay coil being designated 226, and contact 225A is engageable with a contact 225B. It is connected by a conductor 228 with a terminal of the automatic dialing unit 201; and contact 225 is connected by another conductor 229 with that unit. Fixed contact 218C is connected through a resistor 230 with the heater coil of time-delay relay 221; and relay coil 226 has one terminal direct connected similarly. The opposite terminal of coil 226 is grounded, with a rectifier 231 interposed between it and a common junction of contacts 218C and relay coil 226 at 232.

As illustrated in FIG. 6, the network 200 of the dialer 201 includes the usual dial pulse contact 234 and mute or shunt contact 235. One element of the latter is connected to a splice terminal 236, which in turn connects through a lead 237 to the dialer 201. A lead 238 taps into the lead 237 from a common connection with one another of the ring connector R1, the switch unit 136 and the coupling transformer winding 208.

One terminal or post 240 of a terminal strip 241 of network 200 is wired to the dialer 201 through a lead 242; while the second contact element of mute contact 235, as connected to a second terminal post 243 of terminal strip 241, is then connected by a lead 244 with dialer 201. Still another lead 245, which extends from a common connection of tip connector T1, contact 119A of relay 118 and contact 142A of relay 138, is connected to the lead 244, and through it to basic dialer 201.

A first contact element of dial pulse contact 234, as electrically connected to a third connect post 247 of terminal strip 241, is electrically joined by a lead 248 to automatic dialer 201; and a fourth terminal 249 of the strip similarly connects to dialer 201 through a lead 250. The second contact element of pulse contact 234 is wired to a splice terminal 252 of network 200; and a lead 253 connects terminal 252 with ring conductor R2 and the contact 141A of relay 138. Splice terminal 252 is connected by a lead 254 with "E—Z Dial" unit 201.

Finally, a lead 256 connects tip terminal T2 with the lead 250 of network 200; and a lead 257 connects one end of the winding 210 of coupling transformer 209 with the splice terminal 252 and the lead 254 from the latter to dialer 201. A make and break contact 257′ is interposed between transformer winding 210 and lead 257.

In this manner the transformer coupled circuit of the invention, as embodied in FIG. 6, is operatively connected into the automatic dialing system 201, including its mute and pulse contact subnetwork 217, in the manner illustrated at page 3 of the Model 4000 Service Manual mentioned above, substantially reproduced in FIG. 7, and as later described in broad terms.

Referring now to FIG. 5, a telephone set 258 of the intermediate subscriber station S′ is shown as mounted atop a compact casing 259 of the "E—Z Dial" unit or dialer 201. Telephone set 258 is as illustrated and described in my said application, Ser. No. 605,737, being wired between conductors T1, R1 and T2, R2 of the circuit system of FIG. 6. Telephone set 258 includes a dial assembly 260 equipped with the usual four-terminal connecting block 261, as well as a number of control and indicator elements whose description is contained in the copending application, hence will not be described in detail. It suffices to state that these elements include a spring return-type pushbutton release switch 263, a first pushbutton hold switch 264, a second spring return-type pushbutton release or transfer switch 265 and a second pushbutton hold switch 266.

Dial assembly 260 also incorporates a two-line pickup button 267 and an optional light 268 which is illuminated upon termination of the transfer call by the person originating the same.

Components of the automatic dialing unit 201 appearing in FIG. 5 include a name selector indicator 269 (similar in function to the knob 50 of dialing unit 11), and an operator or control member 270 of the switch unit 136.

Referring now to FIG. 7 in conjunction with FIG. 6, upon energization of the coil 226 of pulse contact relay 225 the latter's contact 225A closes against contact 225B and contact 218A engages contact 218C. The coil of timing relay 221 is energized and it times out in 3 seconds. At the same time a circuit is completed through conductor 228 to energize motor relay 272 (FIG. 7) in the "E—Z Dial" circuit from a 60 cycle, 105—130 volt source 273. The belt of the system commences to move through the set 274 of "A"—"B" cutoff contacts and leads 237, 242, 244, 248, 250 and 254, which keeps the contacts open during the running cycle.

The preprogrammed dialing pulses are transmitted to the dial-out line over conductors R2 and T2, make and break contact 257′ and leads 256, 257. At the end of a running cycle the "E—Z Dial" motor will become inoperative because of a slot in the belt, which shorts out the contacts "A" and "B," deenergizing motor relay coil 272 and opening the circuit at lead 228, which stops the motor of the dialing unit or dialer 201.

For the rest, the dialing circuit of FIG. 7 is the same as that shown in the Model 4000 Service Manual mentioned above, with a few changes. That is, a lead to the terminal 276 of inhibit switch 277 is removed, along with a rectifier connected to that terminal. Likewise, some changes in values of capacitance and resistance are made, the need for which will appear to one of ordinary skill. Otherwise, the circuitry of FIG. 7 is known and published, even in regard to values of its components, hence it is deemed neither necessary nor desirable to here detail the same and its mode of operation.

Thus it appears that storing a series of pulses on the magnetic tape belt of the "E—Z Dial" Unit 201 is accomplished first by operating the standard telephone dial of the associated telephone instrument. When the dial is rotated to the selected digit and returns to normal, the opening and closing of its contacts permit negative potential from the power supply to be applied to one contact of the recording head, the other contact being at positive potential. Secondly, the polarity of this voltage will reverse when the dial pulse contacts. In operation, the magnetic polarity of the recording head is reversed in response to the dial pulses and a magnetic pattern is impressed upon the moving magnetic tape belt consistent to the impressed voltage impulses. Dial pulsing from the stored pulses on the magnetic tape, as when a call is being reported, is accomplished by the monostable multivibrator amplified circuit. The recording head now becomes a play back head and the output of the said amplified circuit conditions the operation of two relays simultaneously which duplicate the function of a standard telephone dial operated manually.

I claim:

1. An automatic call-transfer apparatus for use at a subscriber's station having two telephone lines thereto from a telephone system exchange comprising an automatic dialing unit which may be set to dial a selected remote station; an electrical power source; line-coupling means for connection between said lines to complete a communication link at said subscriber's station; a line-hold relay having a first pair of normally open contacts and effective when activated for completing a hold-in circuit from one of said lines to coil means of said line-hold relay and for effecting connection of said one of said lines to said coupling means between said lines, and having a second pair of normally open contacts for completing connection of the other of said lines to the dialing circuit of said automatic dialing unit; a first time-delay relay adapted for connection to said one of said lines and having normally open contacts and a short time response; said first pair of normally open contacts of said line-hold relay being connected to the normally open contacts of said first time-delay relay whereby said first time-delay relay upon closure of its normally open contacts energizes said line-hold relay; a second time-delay relay adapted for connection to said one of said lines and having a longer time response and normally closed contacts; said second time delay being initially activated in response to ringing pulses on said one of said lines; and a ringing relay having its energizing coil normally connected to said one of said lines for response to ringing pulses thereon, having normally open contacts for connecting coil means of said time-delay relays to said power source, having normally open contacts for completing a hold-in circuit including its energizing coil, said power source and the normally closed contacts of said second time-delay relay whereby said second time-delay relay upon opening of its normally closed contacts disconnects said coil means from said power source, the operation of said time-delay relays effecting a cycle of operation of said dialing unit to call said selected remote station for communication via said coupling means at the subscriber's station.

2. The automatic call-transfer apparatus of claim 1, and further including switching means for disconnecting said power source and for disconnecting said ringing relay for normal use at said subscriber's station of telephones connected to said lines.

3. The automatic call-transfer apparatus as in claim 1 additionally including means responsive to resetting signals transmitted over said other of said lines for conditioning the automatic dialing unit to reroute subsequent incoming calls to any other of a plurality of remote stations of the telephone system.

4. The automatic call-transfer apparatus as in claim 1 additionally including means responsive to resetting signals transmitted over said one of said lines for conditioning the automatic dialing unit to reroute subsequent incoming calls to any other remote station of the telephone system.